United States Patent
Lopez et al.

(10) Patent No.: US 6,615,855 B2
(45) Date of Patent: Sep. 9, 2003

(54) STIMULI-RESPONSIVE HYBRID MATERIALS CONTAINING MOLECULAR ACTUATORS AND THEIR APPLICATIONS

(75) Inventors: Gabriel Lopez, Albuquerque, NM (US); Ashutosh Chilkoti, Durham, NC (US); Plamen Atanassov, Albuquerque, NM (US); Venkata Goparaju, Albuquerque, NM (US)

(73) Assignee: Science & Technology Corporation @t UNM, Albuquerque, NM (US)

( * ) Notice: Subject to any disclaimer, the term of this patent is extended or adjusted under 35 U.S.C. 154(b) by 0 days.

(21) Appl. No.: 10/238,852

(22) Filed: Sep. 11, 2002

(65) Prior Publication Data

US 2003/0047220 A1 Mar. 13, 2003

Related U.S. Application Data

(62) Division of application No. 09/790,974, filed on Feb. 23, 2001, now Pat. No. 6,491,061.
(60) Provisional application No. 60/185,057, filed on Feb. 25, 2000.

(51) Int. Cl.[7] .................................. F16K 11/02
(52) U.S. Cl. ................ 137/2; 137/599.01; 137/468; 251/11
(58) Field of Search ............... 137/599.01, 601.13, 137/455, 468, 2

(56) References Cited

U.S. PATENT DOCUMENTS

| | | | | |
|---|---|---|---|---|
| 3,904,111 A | * | 9/1975 | Petersson ............... 236/93 R |
| 4,267,853 A | * | 5/1981 | Yamaguchi et al. ......... 137/67 |
| 5,334,310 A | * | 8/1994 | Frechet et al. ........... 210/198.2 |
| 5,416,074 A | | 5/1995 | Rabaud et al. |
| 5,453,185 A | * | 9/1995 | Frechet et al. ........... 210/198.2 |
| 5,643,247 A | * | 7/1997 | Fernandez et al. ....... 604/891.1 |
| 5,929,214 A | * | 7/1999 | Peters et al. ............... 530/417 |
| 6,071,819 A | | 6/2000 | Tai et al. |
| 6,131,880 A | | 10/2000 | Hahn et al. |
| 6,145,531 A | | 11/2000 | Caszenave et al. |

OTHER PUBLICATIONS

Beebe et al. << Functional hydrogel structures for autonomous flow control inside microfluidic channels, >> *Nature* vol. 404, Apr. 2000.

Blumstein et al. "Permeation Properties of Liquid Crystal–Polymer Composite Membranes," *Advanced Materials*, 1994, No. 6.

Galaev, I Yu "'Smart' polymers in biotechnology and medicine," *Russian Chemical Reviews*, 64 (5) 471–489 (1995).

Hoffman, Allan S., "Environmentally Sensitive Polymers and Hydrogels," *MRS Buletin*/Sep., 1991.

Hoffman, Allan S., "Bioconjugates of Intelligent Polymers and Recognition Proteins for Use in Diagnostics and Affinity Separations," *Clinical Chemistry* 46:9, 1748–1486 (2000).

Iwata et al. << Atomic Force Microscopic Analysis of a Porous Membrane with pH–Sensitive Molecular Valves, >> *Macromolecules* 1998, 31, 3671–3678.

Kanazawa et al << Temperature–Responsive Chromatography Using Poly (N–isopropylacrylamide)–Modified Silica, >> *Analytical Chemistry*, vol. 68, No. 1, Jan. 1, 1996.

Lee et al., << Preparation of surface–modified stimuli–responsive polymeric membranes by plasma and ultraviolet grafting methods and their riboflavin permeation, *Polymer*, vol. 36, No. 1, pp 81–85, 1995.

(List continued on next page.)

Primary Examiner—Stephen M. Hepperle
(74) Attorney, Agent, or Firm—Jagtiani & Guttag

(57) ABSTRACT

The present invention provides a hybrid material and a method for forming a hybrid material comprising actuator made from a stimuli responsive polymer mounted in a porous framework. The present invention also provides devices employing the actuator of the present invention.

14 Claims, 5 Drawing Sheets

Closed Position    Open Position

OTHER PUBLICATIONS

Nozawa et al., << Preparation of thermo–responsive polymer membranes. I. *Journal of Biomedical Materials Research*, vol. 25, 243–254 (1991).

Nozawa et al. Preparation of thermo–responsive membranes. II. *Journal of Biomedical Materials Reserch*, vol. 25, 577–588 (1991).

Schild, H. G., "Poly (N–Isopropylacrylamide): Experiment, Theory and Application," *Prog. Polym. Sci.*, vol. 17, 163–249, 1992.

Turner et al., << Heterogeneous polyelectrolyte gels as stimuli–responsive membranes, >> *Journal of Membrane Science*, 148, (1998) 207–222.

Urry, Dan W., "Free Energy Transduction in Polypeptides and Proteins Based on Inverse Temperature Transitions," 1992 Prog. Biophys. Molec. Bio. 1, 23–57.

Urry, Dan W., "Physical Chemistry of Biological Free Energy Transduction As Demonstrated by Elastic Protein–Based Polymers," *J. Phys. Chem. B.* 1997, 101, 11007–11028.

* cited by examiner

STIMULI-RESPONSIVE HYBRID MATERIALS CONTAINING MOLECULAR ACTUATORS AND THEIR APPLICATIONS

CROSS-REFERENCE TO RELATED APPLICATIONS

This application makes reference to U.S. patent application Ser. No. 09/790,974, now U.S. Pat. No. 6,491,061, entitled "Stimuli-Responsive Hybrid Materials Containing Molecular Actuators and their Applications," filed Feb. 23, 2001, which claims priority to U.S. provisional Application No. 60/185,057, entitled "Stimuli-Responsive Hybrid Materials Containing Molecular Actuators and their Applications," filed Feb. 25, 2000. The entire contents and disclosures of these applications are hereby incorporated by reference.

GOVERNMENT INTEREST STATEMENT

This invention is made with government support under Office of Naval Research Grant No. N00014-00-1-0183. The government may have certain rights in this invention.

BACKGROUND OF THE INVENTION

1. Field of the Invention

The present invention relates generally to microdevices and more particularly to microscopic and nanoscopic actuators.

2. Description of the Prior Art

Stimuli responsive polymers (SRPs) comprise a class of synthetic, naturally occurring and semi-synthetic polymers, which exhibit discrete rapid and reversible changes in conformation as a response to environmental stimuli. These stimuli may include temperature, pH, ionic strength, electrical potential and light. Some of the most studied of these so-called smart polymers are hydrogels which change their water content and excluded volume, in response to temperature. Various types of stimuli responsive polymers in ensembles to control the permeability of solutes and fluids through membranes or through bulk materials have been described. In recent years, these types of polymers have been developed for a variety of different applications including drug delivery, control of protein activity and most interestingly, systems that mimic natural cellular components, such as cellular membranes and secretory granules. Smart polymers that have found use in biotechnology and medicine have been described by I Yu Galaev in *Russian Chemical Reviews* 64: 471–489 (1995) and A. S. Hoffman in *Clinical Chemistry* 46:1478–1486 (2000).

In recent years with the advent of high throughput technologies in use in the pharmaceutical and biotechnology industries, a need for microscopic and nanoscopic molecular actuators has arisen. However, to date there is no stimuli responsive polymer described which can individually serve as microscopic and or nanoscopic molecular actuator to control the transport of other chemical species through molecular-sized pores in a porous material. Hence there is a current unmet need for materials that are able to provide nanoscopic actuation of individual stimuli responsive polymers within or on the framework material. Such materials would ideally be able to address the current needs of: (1) new, inexpensive valving and pumping strategies for control of liquid flow in nanofluidic systems; (2) rapid, energy-efficient, inexpensive chemical separation strategies; based on and (3) reversible affinity matrices for chemical sensing and chemical separations; (4) micropatterning of chemical and biological species; (5) prevention and release of biofouling; (6) optical switching; and (7) tissue engineering.

SUMMARY OF THE INVENTION

It is therefore an object of the present invention to provide a new class of valves made of hybrid materials that use dispersed molecular switches as nanoscopic actuators that individually control the transport of other chemical species through molecular-sized pores in a porous material.

It is a further object to provide a very sensitive mechanism of control of transport through valves by using the individual, molecular actuators to control the permeation and or absorption, by limiting pore size and chemistry of a membrane, thin film or particle constructed from the hybrid material.

It is yet another object to provide a means for selective transport and or adsorption of different molecular species through valves by using size exclusion and/or polarity differences.

It is yet another object to provide a specificity of transport through a molecular actuator that is based on a reversible size, shape or chemical change in the active component of the hybrid material or materials that are used to make the molecular actuator.

In a first broad aspect the present invention provides a hybrid material comprising: at least one actuator, the at least one actuator comprising a stimuli responsive polymer that has first conformation in a first environment and a second conformation in a second environment; and a porous framework material for supporting the at least one actuator.

In a second broad aspect, the present invention provides a method for forming a hybrid material comprising: providing at least one actuator, the at least one actuator comprising an stimuli responsive polymer that has first conformation in a first environment and a second conformation in a second environment; and immobilizing the actuator on a framework material.

In a third broad aspect the present invention provides a valve comprising: at least one channel; and a hybrid material located in the channel comprising: at least one actuator, the at least one actuator comprising a stimuli responsive polymer that has first conformation in a first environment and a second conformation in a second environment; and a porous framework material for supporting the at least one actuator.

In a fourth broad aspect the present invention provides a differential sieve comprising: at least one channel; at least two actuators mounted in sequence in the channel, each of the actuators comprising different stimuli responsive polymer; and means for actuating each of the at least two actuators to form at least two different sized passageways through the channel.

In a fifth broad aspect the present invention provides a peristaltic pump comprising: at least one channel; at least two actuators mounted in sequence in the channel, each of the actuators comprising at least one stimuli responsive polymer; and means for actuating each of the at least two actuators in sequence to pump a liquid present in the channel through the channel.

Other objects and features of the present invention will be apparent from the following detailed description of the preferred embodiment.

BRIEF DESCRIPTION OF THE DRAWINGS

The invention will be described in conjunction with the accompanying drawings, in which.

DETAILED DESCRIPTION OF THE PREFERRED EMBODIMENT

Definitions

Figure 1:
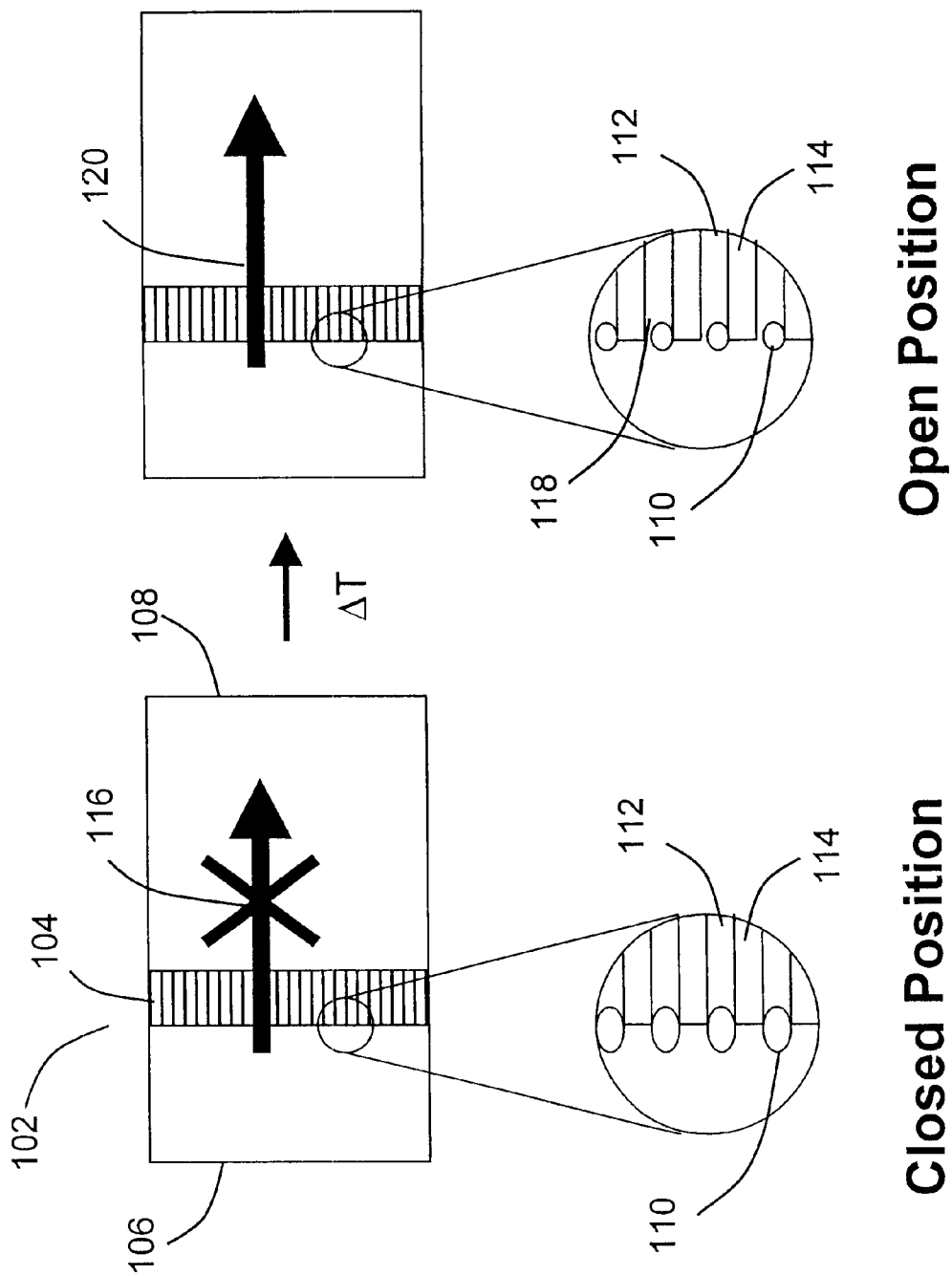
FIG. 1 is a schematic depiction of a cross section of a hybrid material valve of the present invention.

It is advantageous to define several terms before describing the invention. It should be appreciated that the following definitions are used throughout this application. Where the definition of terms departs from the commonly used meaning of the term, the definitions provided below should be used, unless specifically indicated.

Unless specifically indicated otherwise the code for representing nucleotide and/or amino acid sequence characters used in describing the present invention is the standard code used for representing nucleotide and/or amino acid sequence characters and conforms to the code of 37 CFR § 1.822 which in turn conforms to the code set forth in the tables in WIPO Standard ST.25 (1998), Appendix 2, Tables 1 and 3, the entire contents of which is hereby incorporated by reference.

For the purposes of the present invention, the term "diameter" refers to the distance from one side to an opposite side of an object, such as a pore, actuator, etc. in any direction through the middle of the object. The maximum diameter of an object is the longest diameter for that object.

For the purposes of the present invention, the term "hybrid material" refers to one or more actuators bound or associated with a porous framework material. The actuators may be bound or associated with the framework material by any conventional form of binding such as covalent bonding, hydrogen bonding, encapsulation, etc.

For the purposes of the present invention, the term "microsystems" refers to any integrated system where the laboratory chemical reactions are being performed on a miniaturized chip.

For the purposes of the present invention, the term "support framework material" refers to any material used as a support for an actuator of the present invention.

For the purposes of the present invention, the term "microporous" refers to any support framework material having at least one pore having a maximum diameter of no greater than about 20 nm in at least one direction.

For the purposes of the present invention, the term "mesoporous" refers to any support framework material having at least one pore having maximum pore diameter no greater than about 100 nm in at least one direction.

For the purposes of the present invention, the term "macroporous" refers to any support framework material that is not microporous or mesoporous.

For the purposes of the present invention, the term "nano-actuator" refers to any actuator having a diameter in at least one direction of 1 to 100 nm.

For the purposes of the present invention, the term "microactuator" refers to any actuator having a diameter in at least one direction of 100 nm to 1 micron.

For the purposes of the present invention, the term "microfluidic system" refers to any fluidic based microsystem.

For the purposes of the present invention, the term "nanofluidic system" refers to any fluidic based microsystem in which fluid transport is through a channel having a diameter in at least one direction of 1 to 100 nm.

For the purposes of the present invention, the term "biofouling release agent" refers to any substance that counters the tendency of proteins and bacteria to stick to synthetic surfaces within the biological systems.

For the purposes of the present invention, the term "initiator" refers to any substance that is used to initiate the generation of the free radical needed to facilitate the polymerization of the actuator subunits.

For the purposes of the present invention, the term "stimuli responsive polymer" or "SRP" refers to synthetic, naturally occurring and semi-synthetic polymers which exhibit rapid and reversible changes in conformation as a response to environmental stimuli. Example of environmental stimuli can include temperature, pH, ionic strength, electrical potential, light intensity and light wavelength.

For the purposes of the present invention, the term "elastin like polypeptide" or "ELP" refers to any polypeptide having pentapeptide repeats of the following formula:

B-Pro-Gly-X-Gly wherein B is a β-branched amino acid, Pro is proline, Gly is glycine, and X is any amino acid except proline. Examples of ELPs include polypeptides having the following pentapeptide repeats: Val-Pro-Gly-Val-Gly.

Description

An important difference of the present invention from previous microdevices is that the present invention employs the microscopic or nanoscopic actuation of individual stimuli responsive polymers within or on the framework material. The use of individual actuators that control transport, adsorption or absorption allows for the development of materials with molecular selectivity that is turned off or on through the molecular actuation. By using several different types of these individual actuators in series, it is possible to create membranes and absorbents with tunable selectivity that are capable of providing differential discrimination instead of on/off discrimination.

The reversible changes of the molecular actuators of the present invention may be caused in a number of ways. For example, the reversible changes may be induced by changing the temperature, electrical potential, pH, ionic strength, optical field, magnetic field, intensity of light, wavelength of light, etc. present in the environment of the actuator. The reversible changes may also be induced by involving the actuator in a chemical reaction such as ionization, oxidation, reduction, hydrogen bonding, metal complexation, isomerization and covalent bonding.

Stimuli responsive polymers (SRPs) comprise a class of synthetic, naturally occurring and semi-synthetic polymers, which exhibit discrete rapid and reversible changes in conformation as a response to environmental stimuli. These stimuli can include temperature, pH, ionic strength, electrical potential, light intensity and light wavelength. Some of the most studied of these so called smart polymers are hydrogels which change their water content and excluded volume, in response to temperature. In recent years, these types of polymers have been developed for a variety of different biotechnological applications including drug delivery, control of protein activity and most interestingly, systems that mimic natural cellular components, such as cellular membranes and secretory granules.

Some of the best studied of these types of polymers are hydrogels that change their aqueous solubility, and thus volume, in response to temperature. This phase change occurs over a relatively short temperature span ranging from 2–3° C. and the midpoint of this temperature range is usually denoted the transition temperature ($T_t$.) These compounds are universally amphiphilic with the degree of hydrophobicity of the nonpolar phase playing a major role in determining stimuli response. In general, it is thought that the collapse of the relatively disordered hydrogel at low temperature to a more collapsed and hence ordered state at higher temperature is driven by entropic sources, that is the disorder of clathrate-like water around hydrophobic groups. This idea is supported by the finding that for most SRPs, the $T_t$ may be modified by copolymerization with other molecules, by concentrations of certain ions, including pH. In the case of copolymerization, the addition of more hydrophobic segments to the polymer decreases the $T_t$, whereas those residues that increase the overall hydrophilicity increase the $T_t$. Similarly, it is thought that salt effects, that serve to lower $T_t$, do so by increasing the entropic drive toward disorder of the ordered water surrounding hydrophobic groups.

A preferred SRP for use in the actuators of the present invention is elastin, a protein found in mammalian connective tissue. Elastin provides elasticity to those structures, such as skin and blood vessels, which need the capacity to stretch without losing their integrity. Elastin fibers as they occur in vivo are composed of protein plus glycoprotein residues. The protein component of these fibers, tropoelastin, is water soluble below 25° C. When the temperature is raised above this threshold, the polymer begins to aggregate into parallel helical filaments, a process that is complete at ~40° C. This process is reversible upon lowering the temperature. The basis of this transition is found within a series of repeating pentapeptide structures, based on the sequence $Val^1$-$Pro^2$-$Gly^3$-$Val^4$-$Gly^5$ (VPGVG). Within the fibrous structure, the pentapeptide repeats are arranged in to a folded β-spiral with a pitch of 15 amino acids i.e. 3 pentapeptides.

The elastin like polypeptides (ELPs) of the present invention include pentapeptide repeats similar to the pentapeptide repeats in elastin. The pentapeptide structure in the ELPs of the present invention is preferably conserved for proper function of the protein: the second and third position Pro and Gly are responsible for maintaining the β-spiral, while the Gly at position 5 is preferred for both fibrous structure and elasticity. A β-branched amino acid is preferred at position 1 to maintain reversibility of the phase transition. Position 4 may be freely substituted with any amino acid except Pro and the relative molar concentrations of different amino acids at this position give rise to polypeptides with differing transition temperatures. For example, polymers of the basic sequence VPGVG have a $T_t$ of 28° C., whereas a polymer with phenylalanine at position 4 has a projected $T_t$ of −30° C., and a substitution of serine yields a polymer with a projected $T_t$ of 1050° C. Polymers with intermediate $T_t$ may be generated by varying the mole fraction of different amino acids at position 4.

The significance of the phase transition in the natural function of elastin is suggested by the observation that synthetic forms of the crosslinked polypeptide exhibit an increase in elastomeric force upon transition through $T_t$. Furthermore, it has been shown that both the $T_t$ and the development of this elastomeric force may be modulated by physical and chemical signals in the environment. Increasing the ionic strength, so that the salt concentration approximates that found in human serum, for example, results in the decrease in $T_t$ of poly (VPGVG) to approximately 21° C., with a concomitant increase in the elastomeric force of the polymer at 25° C. Similarly, changes in pressure and pH may also modulate $T_t$ and elastomeric force. These observations indicate that the $T_t$ of elastin confers elasticity upon the polymer and, furthermore, serves as a way to couple chemical signals to mechanical processes. Additional support for this proposition is given by the observation that phosphorylation of a polymer composed of poly (IPGVG) containing the target site RGYSLG for protein kinase, results in an increase of $T_t$ of the polymer to 30° C., which is then reversed upon dephosphorylation.

Chemical signals may be used to modulate $T_t$ and the elastomeric response of ELPs. Also, adaptations to the basic ELP structure may be made that allow these compounds to be used in environmentally sensitive mechanical devices. For example, the insertion of a protein kinase phosphorylation site and its effects have already been described previously. A redox carrier nicotinamide may be introduced into poly-VPGVG to modulate $T_t$ with the reduction of the pendant group lowering $T_t$. Similarly, incorporation of a phenylazoanaline derivative into an ELP polymeric sequence results in an increase in $T_t$ upon illumination.

Another SRP of the present invention that exhibits a phase transition similar to ELPs, is poly N-isopropylacrylamide (PNIPAAM). Aqueous solutions of this polymer show a $T_t$ of ~32° C. and, as with ELPs, the $T_t$ may be raised and lowered by copolymerization with hydrophilic and hydrophobic monomers, respectively. In addition, $T_t$ can be modified by changes in pH and ionic strength of the surrounding medium. The process of the transition is also thought to be similar, with the phase transition being driven by a decreased order in water of hydration around the hydrophobic moieties upon collapse of the polymer above $T_t$.

The properties of PNIPAAM may be exploited for a number of processes, many of them biotechnical. For example, PNIPAAM may be used as a biofouling release agent. PNIPAAM may be grafted onto solid surfaces by means of plasma-induced free radical graft polymerization from a polymer support or from azoinitiators immobilized on the surface of a self-assembled monolayer. Such switchable hydrophilic-hydrophobic surfaces may be used as a means to control flow of liquids in microfabricated devices. The control of surface tension in capillary devices may have significant influence on the motion of liquid droplets within these systems. By programming changes in the surface tension of immobilized PNIPAAM, PNIPAAM may be used for providing pumps and valves for microfluidic systems.

Other preferred SRPs of the present include polymers sensitive to electric fields such as diacrylates. Diacrylates may be coated in the pore channels of various framework materials and photopolymerization used to store the liquid crystal order of the polymer indefinitely. The structure so produced changes with applied electric field.

Essential active components for the fabrication of microfabricated, chip-based, nanofluidic systems, e.g. porous silica gels, nanofabricated artificial gels, etc., include pumps and valves and the actuators of the present invention may be used to manufacture such pumps and valves.

Together with nanoscopic flow channels, which include bifurcations and confluences, these components may be used to form complex microfluidic systems for a variety of applications, including chemical sensing and biotechnological separations. Current pumping technologies in microfluidic systems are based on external pressure sources, electroosmotic flow, or vaporization of small amounts of liquid in microchannels. Valving technologies include those based on electrostatic deformation of silicon. Many of these strategies, especially those based on micromachined silicon, are complex and expensive. Here we propose a new, inexpensive class of active microfluidic components based on ELP actuation that may be incorporated into microfabricated silicon, glass or polymeric microchannel networks. The components described below may be classified into elastin-based nanoactuators and elastin-based microactuators.

FIG. 1 illustrates a channel 102 including a hybrid material valve 104 of the present invention in both a Closed Position on the left and in an Open Position on the right. Valve 104 is located between two free flowing portions 106, 108 of channel 102. In FIG. 1 a circled portion 110 of channel 102 has been magnified to show the operation of hybrid material valve 104 in detail. Hybrid material valve 104 includes actuators 110 that are located in respective pores 112 of a porous framework material 114. Actuators 110 are covalently attached to framework material 114. As shown in the Closed Position, initially molecular flow of liquid (not shown) through the valve is blocked as shown by blocked arrow 116. A net change in temperature $\Delta T$, either an increase or a decrease in temperature depending on the actuator material, changes the properties of actuators 104 in such a way that passages 118 are formed that allow molecular flow through hybrid material valve 114.

Although the hybrid material valve in FIG. 1 is shown as operating based on a change in temperature of the environment surrounding the valve, other types of environmental changes may be used to operate the valve by choosing different materials for the actuators. For example, depending on the particular stimuli responsive polymer used for the actuator, the actuator may change in size: by changing the pH of the actuator's environment, by changing the intensity of light to which the actuator is exposed, by changing the frequency of the light to which the actuator is exposed, by changing the magnetic field to which the actuator is exposed, by changing the ionic strength of the environment surrounding the actuator, etc. Preferably, the actuator will revert to the actuator's original size if the environmental conditions are reversed to the actuator's original environment, allowing the valve employing the actuator to be repeatedly opened and closed.

Preferred SRPs used in the actuator of the present invention include ELPs and elastin, although other SRPs may be used in the actuator of the present invention. SRPs may be used as actuation elements in functional nanostructured materials and microelectro-mechanical systems (MEMS). New SRPs may be created or existing SRPs chosen for use in particular actuators of the present invention based on the properties of the SRPs. Examples of properties that may affect the way a particular SRP behaves as an actuator include: the molecular composition of the SRP, the molecular weight of the SRP, etc. The properties of a particular SRP will affect which type of environmental condition, such as temperature, pH, light intensity, light wavelength, etc. may be employed to actuate the actuator made from the SRP. The properties of the SRP may also influence the point at which a change in environmental condition will cause an actuator made from the SRP to be actuated. For example, actuators having different temperatures of actuation made be produced from ELPs having the same pentapeptide repeats by using ELPs having different molecular weights. Actuators made from the same ELP could also have their temperature, pH, light intensity, light wavelength, etc. altered by reacting the ELP with different chemicals to bind active groups on the ELP and increase or decrease the ELP and hence, the actuator, to changes in environmental conditions.

A preferred porous framework material for the present invention is silica because nanostructured silica thin membranes, microporous and mesoporous silica membranes may be synthesized using standard sol-gel processing. These membranes exhibit the following hallmarks: (1) the pore structure including pore size, pore density and pore distribution, may be precisely controlled; (2) sol-gel synthesis enables in situ formation of the membrane within microfluidic systems and hence, membrane fabrication is compatible with implementation in microfabricated systems; (3) many commercial reagents are available for surface modification of the silica membrane surface that allow covalent immobilization of the SRPs; and (4) formation of porous silica through sol-gel synthesis may result in a protein compatible encapsulation of the protein in which the structure and function of the protein are preserved.

Although a preferred porous support framework material for the present invention is silica, other preferred framework materials include semiconductors such as silicon, ceramics, and glasses such as alumina, titania, etc. Surfaces containing metals that have been created by electrodeposition may also serve as the framework material for the present invention.

The porous framework material of the present invention may also be a flexible material instead of a rigid material such as a ceramic, a semiconductor, or a glass. For example, the porous framework material may be different kinds of plastic such as acrylates, methacrylates such as poly(methyl methacrylate), vinyl polymers nylons, fluoropolymers, etc or different kinds of elastomers such as silicones, polyurethanes, etc.

Hybrid materials of the present invention employing specific actuator materials and framework materials may be used in various applications. For example, hybrid, bioorganic/inorganic nanostructured materials that are comprised of SRP-metal oxide composites may be designed and synthesized for specific application as nanoscopic valves, pumps and molecular sieves that may be incorporated in hierarchically designed nano/microelectromechanical systems.

Hybrid materials of the present invention may be used to provide nanoactuators in various types of devices. For example, SRPs that undergo critical solubility transitions in aqueous solutions in response to changes in redox state, in addition to temperature may be used as nanoactuators. Hybrid, bio/organic/inorganic materials comprised of SRP-metal oxide, SRP-polymeric or SRP-metallic composites may be used for applications such as nanoscopic valves, filters, and adsorption matrices that may be incorporated in hierarchically designed nano/microelectromechanical systems. Molecularly dispersed SRPs may be incorporated into mesoporous membranes e.g., formed from organic polymers or silica produced by sol-gel polymerization, either by copolymerization, templating or decoration of existing pores. The large change in the polymer's excluded volume and polarity caused by the solubility transition to vary the permeability and pore polarity of the hybrid membranes may be exploited to form fluidic valves, selectively permeable membranes and selectively-adsorptive coatings. Hybrid responsive particles incorporating SRPs may be useful as tunable adsorbents and catalysts. Preferably, the SRPs used as nanoactuators have well-defined molecular weights and transition temperatures and low polydispersity.

SRP-based valves of the present invention may be formed by immobilizing an SRP on, or in, microporous or mesoporous ceramic supports formed by sol-gel processing. Other polymeric membranes for e.g., Nucleopore, may be used, but sol-gel derived membranes are preferred for many applications of the present invention because they are likely to be easily incorporated into microfluidic systems. A preferred ceramic support may be formed by depositing macroscopic silica membranes on alumina supports in a homemade, temperature controlled permeation cell.

Methods for minimizing the pressure drop across valves of the present invention include fabrication of asymmetric membranes with minimal skin resistance. Methods for immobilization of SRPs on a silica membrane framework material include covalent immobilization subsequent to formation of the porous silica membrane and encapsulation of SRPs in the silica membrane during synthesis.

To form nanoactuated valves of the present invention, SRPs may be immobilized on microporous or mesoporous ceramic supports. Preferably, pre-formed microporous or mesoporous silica supports are generated by organic templating and initial valves are formed using asymmetric ceramic membranes comprising a thin porous silica permeation barrier coated onto macroporous alumina supports. Macroporous alumina supports allows membrane characterization in a pressurized macroscopic permeation cell. After fabrication of the asymmetric ceramic supports, SRPs are immobilized to the surface within the permeation cell apparatus. Several methods for immobilization of the SRPs to the silica are possible, including covalent coupling of actuated SRPs to silica modified with functionalized silane reagents e.g., aminopropyl triethoxysilane, mercaptopropyl trimethoxysilane. Through use of a permeation cell during the immobilization procedure, SRPs may be adhered to porous silica supports in a manner that results in a leak-tight valve when the SRP is in the SRP's hydrated state i.e., below the SRP's $T_t$. Blocking reagents e.g., other proteins that are irreversibly adsorbed onto the silica surface, may be used to ensure that valves are leak-tight.

Porous silica may be templated with SRPs. Nonporous hybrid materials may be formed in which molecular templates are encapsulated in a dense silica matrix through sol-gel processing. The mild reaction conditions and protein compatibility of sol-gel derived silica, along with the ease with which this process is used to form thin films, membranes and particles, enables the synthesis of a new class of hybrid, smart bio/inorganic materials. A preferred hybrid material of the present invention is silica-encapsulated SRP. Synthetic methods to produce hybrid materials where the SRP is randomly incorporated into a silica matrix may be used to form such a hybrid material. In forming such a hybrid material, the concentration of SRP may be controlled at or slightly above the percolation threshold of the SRP, and thus, a phase transition of the SRP results in an increase at a temp above $T_t$ or decrease (below the $T_t$) of the permeance of the hybrid membrane.

Several different additional types of hybrid materials of the present invention include: (1) composite responsive particles for chromatographic separations, (2) composite responsive films for regenerable selective sensor coatings, and (3) composite smart membranes for valving and filtering applications. In each case, preferred materials allow for rapid response to external stimuli e.g., thin films or particles that exhibit fast solvent and solute diffusion which allow rapid response to external stimuli such as changes in temperature. In synthesizing the hybrid materials of the present invention, synthesis conditions are optimized to achieve molecular dispersion i.e., to avoid phase segregation of the SRP, creation of a dense silica encapsulation matrix, and templating of the silica to form pores of similar size and shape to the hydrated SRPs. Factors that influence the molecular dispersion of the SRPs include the solvent quality during polymerization of the silica, the polarity of the silica precursors used and the gelation rate. Factors that influence the creation of a dense silica encapsulation matrix include the degree of sol aging i.e., extent of reaction of the oligomeric silica and post polymerization heat treatments. Preferred materials for use as actuators of the present invention also include materials that have functional properties such as absorbency, adsorbency, and permeability that are thermally responsive and that have a response that is reversible.

To determine if a particular actuator material is suitable for use in chromatographic separations, selective adsorbance of solutes from solution may be measured by UV-visible spectroscopy. To determine if a particular actuator material may used as column packing materials in "smart" chromatographic separations, the actuator material may be tested for the range of aqueous solvent conditions under which the inverse solubility transition occurs. To determine an actuator material's suitability for sensor applications, thin thermally responsive composite films may be coated on gold film electrodes and preferential partitioning of selected redox active analytes e.g., $K_3Fe(CN)_6$, a relevant analyte in monitoring of nuclear waste from solution into the film may be measured by electrochemical and spectroelectrochemical techniques.

Figure 2:
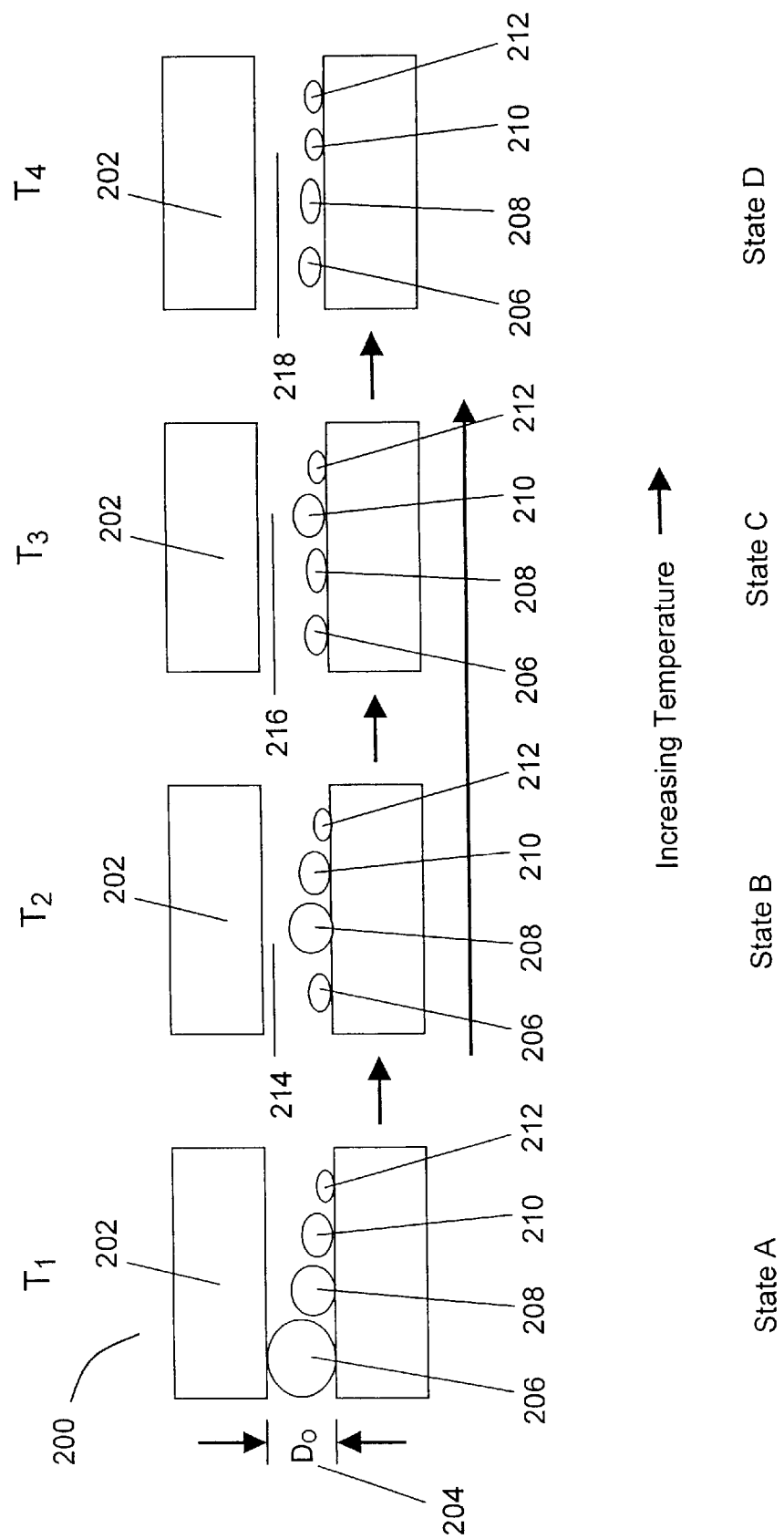
FIG. 2 is a schematic illustration of a cross section of a SRP-based tunable molecular sieve of the present invention.

The SRP-based nanovalving strategies described above may be extended to the fabrication of new types of molecular sieving devices that incorporate in situ tuning of pore size in size exclusion membranes. FIG. 2 shows a schematic illustration of a cross section of a tunable molecular sieve 200 of the present invention composed of a framework material 202 having a pore diameter 204 and actuators 206, 208, 210 and 212 that are immobilized on framework material 202. Actuators 206, 208, 210 and 212 are composed of a homologous series of SRPs ranging in molecular weight (MW) and hence $T_t$. Actuator 206 is made of an SRP having a known molecular weight X. Actuator 208 is made of an SRP having a molecular weight of X–W. Actuator 210 is made of SRP of having a molecular weight of X–Y, and actuator 212 is made of an SRP having molecular weight of X–Z. Actuators 206, 208, 210, 212 are immobilized in support framework material 202 having a pore diameter of 204. As the temperature is increased through States A, B, C and D, the size of the SRPs namely the actuators 206, 208, 210 and 212 respectively, is varied, thereby effectively varying the size of the molecules that will be able to pass through the pore 204 and allowing, molecular sieve 200 to function as a molecular sieve.

State A of FIG. 2 depicts the shapes and sizes of the actuators 206, 208, 210 and 212 under the initial temperature condition $T_1$. In State A, actuator 206 is almost the same size as pore diameter 204. Actuator 208 is smaller than 206 but bigger than actuator 210. Actuator 212 is the smallest. Because actuator 206 blocks pore 204 in State A, effectively no molecules can pass through molecular sieve 200.

State B shows what happens to molecular sieve 200 as the temperature is increased to $T_2$, and actuator 206 changes in size. As shown in State B of FIG. 2, the size of actuator 206 has decreased while the size of actuators 208, 210 and 212 has remained the same. As a result a small passageway 214 is now available through which molecules whose sizes are smaller than or equal to the size of passageway 214 are able to pass through molecular sieve 200.

At State C of FIG. 2, the temperature is further increased to $T_3$, the size of actuators 206, 210 and 212 are unchanged as compared to State B. However, actuator 208 has become substantially smaller. The resulting passageway 216 produced by the reduced size of actuator 208 allows different molecules (not shown) to pass through molecular sieve 200, provided the size of the molecules are equal to or smaller than the size of passageway 216. Passageway 216 is slightly larger than passageway 214.

At State D of FIG. 2, the temperature is further increased to $T_4$, the size of actuators 206, 208 and 212 are unchanged compared to State B. However, actuator 210 has become substantially smaller. At State D molecular sieve 200 a passageway 218 is formed through molecular sieve 200 that is larger than either passageway 214 or 216. Passageway 218 allows larger molecules that were unable to pass through molecular sieve 200 in States A, B and C to now pass through molecular sieve 200.

Although for simplicity a single pore of a framework material is illustrated in FIG. 2, framework materials of the present invention may have many pores each of which includes a molecular sieve of the present invention.

The precision with which the temperature may be controlled provides a means to control the pore size of the material that will pass through the molecular sieve of the present invention. At different times the same setup of the molecular sieve may be used to allow different molecules to pass in a temperature dependent manner.

A preferred actuator material for the tunable molecular sieve of the present invention may be made as follows: A variety of SRPs with different and well-defined molecular weights and hence different $T_t$s, are synthesized. These proteins are then used to form hybrid composite structures, similar to those described above for use with a valve of the present invention, that incorporate the SRP in porous membranes that have a well-defined pore size i.e. monodisperse pore size distribution. By combining such hybrid membranes in series, a tunable molecular filter may be constructed in which the transport-limiting pore size is determined by the population of SRP molecules that is desolvated. Alternatively, several SRPs with different molecular weights, hydrodynamic radii and transition temperatures may be immobilized in a single porous membrane of well-defined pore size. The different SRPs may be loaded into the pores of the membrane either randomly or in an ordered fashion as depicted in the FIG. 2. In either case, because the transition temperature is normally directly proportional to the molecular weight of the SRP variant, a slow increase or decrease of the temperature will result in a gradual change in the transport limiting pore size.

To form the tunable molecular sieving structure, the different sized SRPs may be immobilized either in order of their size, or randomly in the direction of permeation. Several methods for immobilizing the series of SRPs may be used, including those based on covalent decoration of pre-existing pores and encapsulation during silica polymerization (vide supra). For example, multilayer sieving constructs may be formed by sequential dip or spin coating of hybrid SRP-silica precursors. As with the valves of the present invention, the actuator materials for use with molecular sieve of the present invention may be actuated in a number of different ways including temperature changes, pH changes, light intensity changes, light wavelength changes, ionic strength changes, etc.

The previously described use of the hybrid materials of the present invention for use as valves or molecular sieves may be classified as examples of SRPs in nanoactuation. The present invention also envisions several applications of stimuli responsive materials, as nanoscopic actuators for use in SRP-based active components such as nanovalves, nanopumps for nanofluidic systems.

There is a current need for expanding the repertoire of methods for controlling flow of fluids in microsystems, such as by using nanovalves and nanopumps. Many current strategies, especially those based on micromachined silicon, are complex and expensive, and not amenable to rapid implementation in new nanofluidic designs. The present invention provides a new, inexpensive, class of active components based on SRP actuation that may be incorporated into microfabricated and nanofabricated silicon, glass or polymeric microchannel networks.

Figure 3:
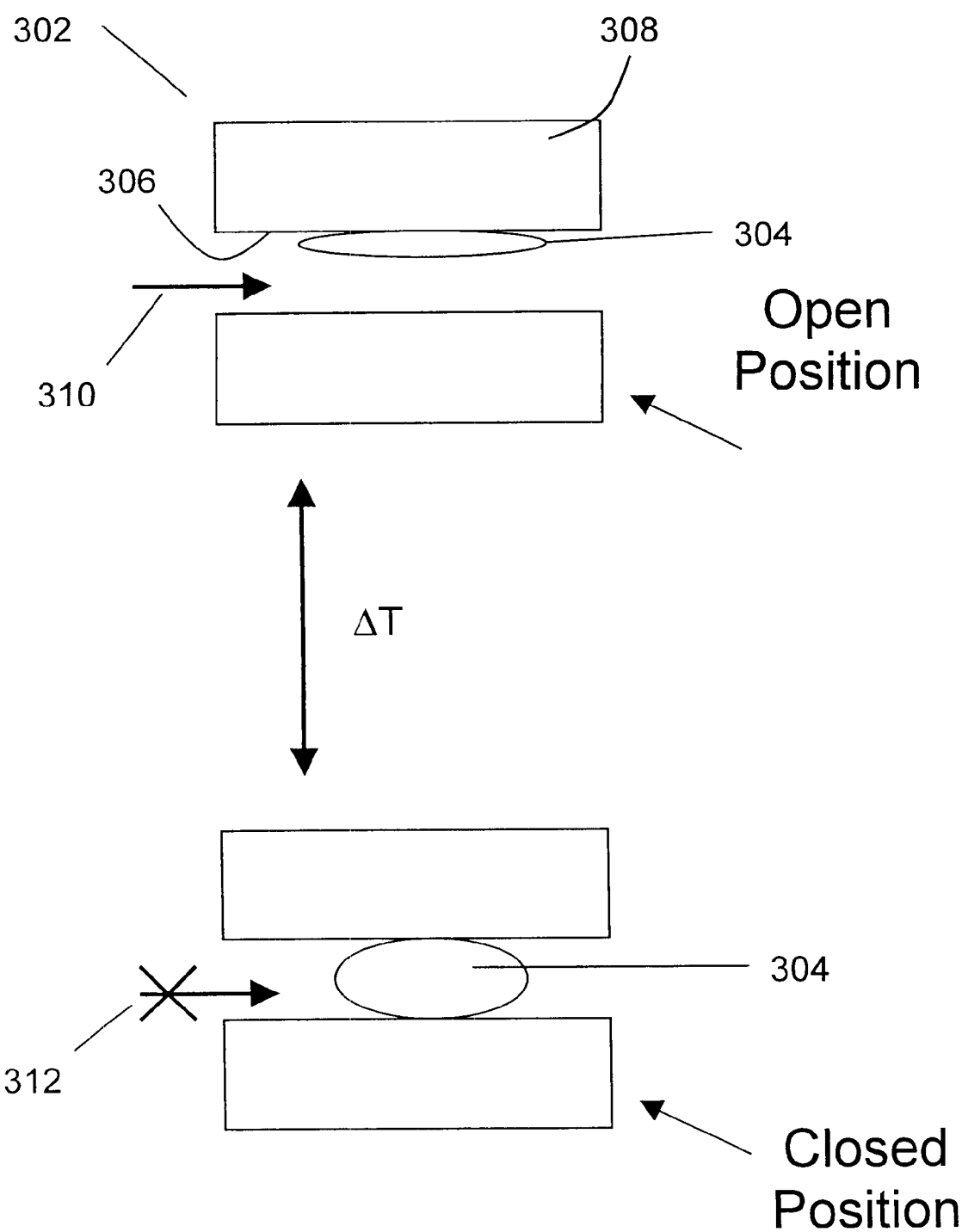
FIG. 3 is a schematic illustration of a cross section of an SRP-based valve in a nanoscopic channel constructed in accordance with a preferred embodiment of the invention.

FIG. 3 shows a cross section of a valve 302 of the present invention. Valve 302 includes an actuator 304 located in a nanocapillary 306 of a framework material 308. In an open position, shown at the top of FIG. 3, valve 302 is open and fluid (not shown) may flow through valve 302 as indicated by arrow 310. As the temperature changes, the property of actuator material changes such that valve 302 is now in a closed position, as shown in the bottom of FIG. 3, and the flow of liquid through nanocapillary 306 is blocked as indicated by blocked arrow 312.

Although for simplicity a single nanocapillary of a framework material is illustrated in FIG. 3, framework materials of the present may have many nanoscopic channels each of which includes a peristaltic pump of the present invention.

Preferred actuator materials for use in the microvalve of FIG. 3 include ELPs and PNIPAAM.

Preferred porous framework materials for use in the microvalve of FIG. 3 include nanofabricated silicon and porous silica prepared by sol-gel processing.

Figure 4:
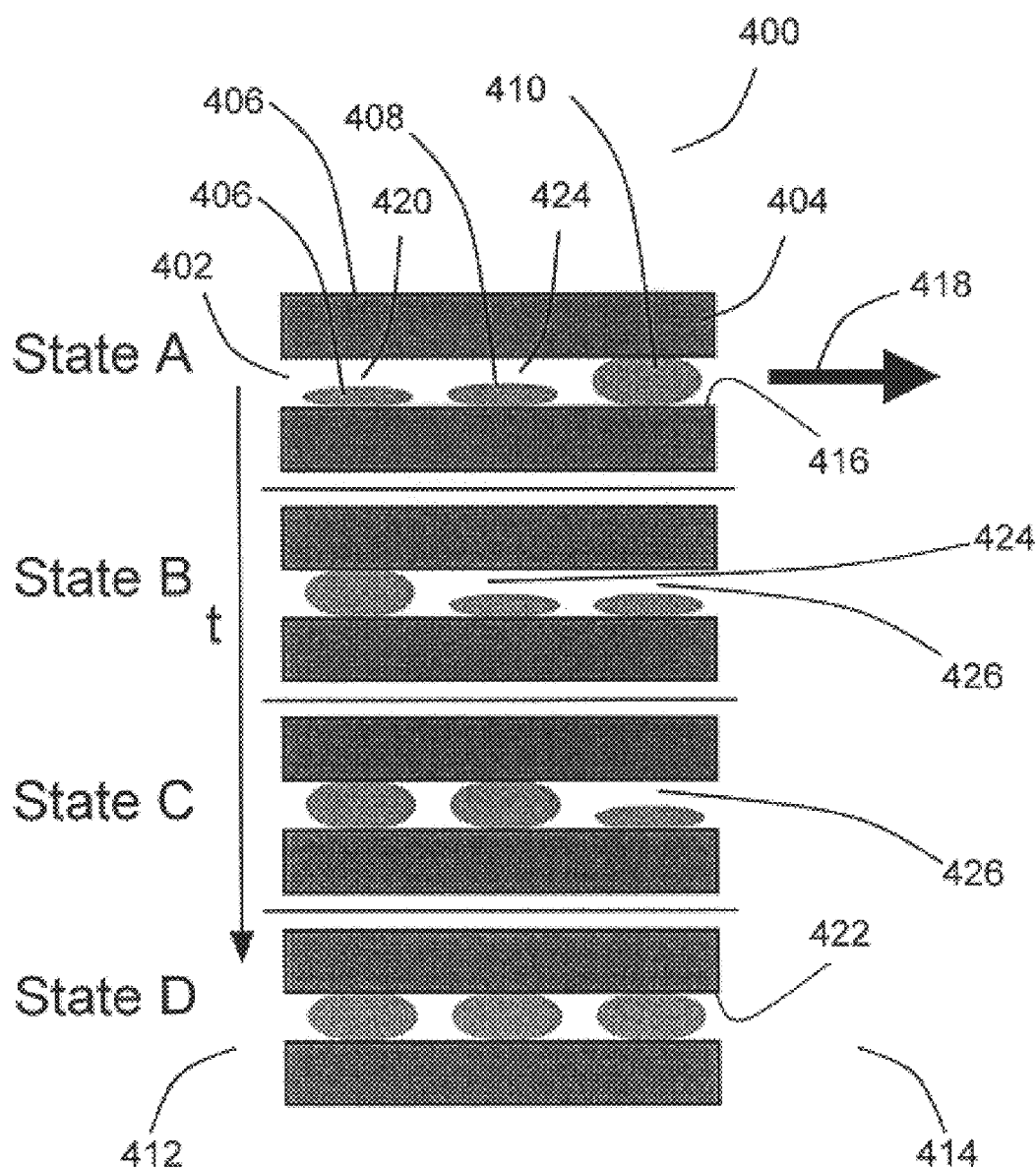
FIG. 4 is a schematic illustration of a vertical section through a SRP-based peristaltic pump of the present invention.

FIG. 4 illustrates a vertical section through a SRP based peristaltic pump of the present invention. A peristaltic pump 400 includes a channel 402 in a framework material 404 in which are mounted three actuators 406, 408 and 410 in close proximity to one another. Actuator 406 is located at the proximal end 412 of channel 402. Actuator 408 is present in the middle of channel 402 while actuator 410 is located at the distal end 414 of channel 402. Actuators 406, 408 and 410 are covalently bound to bottom 416 of channel 402.

Although FIG. 4 shows the actuators attached to the bottom of the channel, in another embodiment of the present invention the actuators may be attached to the top of the channel. In yet another embodiment of the present invention some of the actuators may be attached to the top of the channel while others may be attached to the bottom of the channel. Also some other preferred embodiments of the present invention may use means other than covalent attachment to attach the actuators to the channel. Also some other preferred embodiments of the present invention may use means of encapsulation to entrap the actuators in the channel.

By changing the temperature in the environment surrounding actuators 406, 408 and 410; actuators 406, 408 and 410 may be actuated successively and in a coordinated manner to allow for peristaltic pumping of fluid (not shown) in the direction shown by arrow 418 through channel 402.

States A, B, C and D of FIG. 4 show the changes in the shapes of actuators 406, 408 and 410 respectively, corresponding to the temperature changes.

State A shows the shapes of actuators 406, 408 and 410 in channel 402 at initial starting temperature. At State A, the shape of actuator 410 is such that actuator 410 completely occludes channel 402. Actuators 406 and 408 are identical to each other in size but smaller than actuator 410. A space 420 is present between top 422 of channel 402 and actuator 406. A space 424 is present between actuator 408 and top 422 of channel 402. Spaces 420 and 424 are available for occupation by incoming molecules (not shown) entering channel 402 through proximal end 412.

At the temperature depicted by State B of FIG. 4, the shape of actuator 406 has changed such that space 420 of channel 402 is completely occluded. The shape of actuator 408 remains unchanged while the shape and size of actuator 410 is now such that it allows the space 426 at the distal end 414 of channel 402 to open up. Under these conditions molecules that were present in spaces 420 and 424 in channel 402 in State A now occupy the spaces 424 and 426, respectively, of channel 402.

In State C of FIG. 4 the temperature is such that now both actuators 406 and 408 are swollen such that they both completely occlude the spaces 420 and 424 of channel 402. Under these conditions the shape of actuator 410 remains unchanged. The molecules that were present in space 424 of channel 402 is pushed to space 426 of channel 402 thereby causing the fluid 418 that was present space 424 in State B of FIG. 4 to exit through the distal end 414 of channel 402.

Finally with a further change in the temperature, State D of FIG. 4 is achieved. At this temperature the shapes of the three actuators namely 406, 408 and 410 in channel 402 are such that they completely occlude spaces 420, 424 and 426. This results in the remainder of the molecules that had entered the channel 402 through the proximal end 412 in State A, to be pushed out of distal end 414 of channel 402.

Repetition of the above steps in a cyclical manner results in fluid being pumped from the proximal end of channel 402 to the distal end. Thus rapid successive actuation of these actuators in a coordinated manner allows for peristaltic pumping of fluids within the channel in a directional manner.

ELPs are preferred actuator materials for use in the peristaltic pump of the present invention. Depending on how the actuators in the peristaltic pump are actuated, the actuators in a particular pump may all be made from the same ELP or from different ELPs. Successive actuation of the ELP actuators of the invention may be accomplished either by use of independently controlled heaters or by incorporation of individual ELP actuators with systematically varying transition temperatures. Successful implementation of the thermally actuated ELP based peristaltic pump preferably employs precise thermal management. The discrete thermal response of ELPs that is the critical nature of the inverse solubility transition is a key property of the present invention that enables its successful implementation in nanopumps. Thus, it is possible to design the circuitry, fluidics and operating conditions that respond to rapid temperature changes including both heating and cooling because only small temperature changes are necessary to cause mechanical actuation of the ELP based materials. Such ELP based nanoperistaltic pumps may be very useful for bioanalytical applications such as separations and immunoassays performed in pharmaceutical industry or for multiple sample handling systems such as those used in the high throughput screening operations.

Other SRP actuator materials that are actuated by pH, electrical fields, frequency of sound waves, light of varying wavelengths, light of varying intensity may also be employed in the peristaltic pump of the present invention.

In order to incorporate ELP responsive materials into microfluidic systems it is desirable to be able to form and or immobilize preformed ELP-based gels at specific locations in microcapillaries. It is also desirable to provide heaters and/or electrodes for the thermal or electrochemical actuation of the ELP actuators and to use a software interface to control the actuators for function as discrete actuators i.e., on/off, and continuous actuators i.e., flow controllers and pumps.

In addition to the applications described above, the actuators of the present invention may also find many uses including applications in electrophoresis, gel based separations, controlled release, high throughput screening and chemical sensing, ultrafiltration membranes employing toggling of actuators, tunable size ultrafiltration, nanofluidics systems.

The actuator of the present invention when made from materials such as poly(N-isopropylacryl amide) or ELPs may be immobilized in framework materials that are incorporated in fluid channels of nanoscopic dimensions. These actuators may act as nanovalves or nanogates to control the flow of fluid in nanochannels. The individual polymer chains are responsible for actuating action. Such materials may be used in chip based chemical separations, controlled delivery of reagents to a chemical reaction etc.

The hybrid materials of the present invention may be used in the regeneration of bioactive surfaces. Material accumulates on the surface, or within the pores, of the active hybrid material and may be released in response to actuation of the active material i.e. a change in the state of the active material. For example, biofilms are biological films containing proteins, cells and/or other biological matter that attach to synthetic surfaces. These biofilms may be beneficial e.g., bioreactors, cell culture, implants, or detrimental e.g., biofouling. By actuating the hybrid materials of the present invention, it may be possible to change the material properties to a state that favors release of the attached biofilm. The hybrid materials of the present invention may also be employed to regenerate affinity matrices. Affinity sensors and columns for separation rely on immobilized receptors to capture the analyte of interest. In conventional sense it is often impossible to regenerate the original affinity binding matrix. By forming the receptor bearing active surface on the hybrid materials of the present invention, it may be possible to use the actuation properties, change of state, to elicit release of the analyte upon demand. Release of the analyte upon demand may allow the receptor surface to be regenerated and to be re-used. Such reversible affinity matrices are useful in such applications as biosensing and bioassay, affinity based chemical sensing and detection, and separation and purification of mixtures. In some applications of the hybrid materials of the present invention, it is possible to form the receptors out of the hybrid material itself, without the need for an attached bioreceptor. Again, the actuation properties of the hybrid material may cause reversible binding.

The hybrid material of the present invention may be used in chromatography. For example, a chromatographic column may be used to uptake the component of interest in a mixture. Actuation of the hybrid material comprising the column is then used to release the component of interest to be collected as a purified product.

The hybrid material of the present invention may be also used in preconcentration. For example, chemical or biological component of a solution may be concentrated on or in the hybrid material. Actuation of the material results in release of the component.

The hybrid material of the present invention may also be used in patterning. For example, it is possible to selectively actuate a portion of the smart hybrid material, e.g. in film form, through selective application of the actuation mechanisms, e.g., light, heat, electricity, etc. A material can then be patterned if the material selectively adsorbs, attaches or imbibes into the area that is selectively activated. Materials that may be patterned may include: small molecules, metals, metal clusters, inorganic materials, e.g. semiconductors or optical materials, biomolecules, cells. Reversal of the activating mechanism may be used to regenerate or erase the unpatterned surface which may then be patterned or rewritten again.

The hybrid materials of the present invention may also be used to control the release of soluble molecules from reservoirs in which the soluble molecules are concentrated. The mechanism of transport or flow may be diffusion, electrophoresis, pressure driven flow or otherwise. Applications include controlled delivery of drugs to a patient or part of a patient, chemical separations, especially bioseparations, e.g. from one part of a multistate separation apparatus to another.

In some applications, it may be useful to change the optical properties of the hybrid materials of the present invention by actuating the actuators Such applications may include: active optical materials, switching in optoelectronic circuits, data storage, etc.

In particular, hybrid materials employing actuators made from PNIPAAM or ELP may be used for biological cell attachment and detachment without cell damage and may be capable of directing the attachment and spreading of cells on the membrane surface. By using cell activation/deactivation or cell attachment/detachment control by temperature-modulated surface of the hybrid materials, such hybrid materials may be used to prepare novel bioartificial organs by multi-layering different cell types to mimic tissue structures for tissue engineering.

The present invention will now be described by way of example:

EXAMPLE 1

Heaters and electrodes are incorporated into prototype microfluidic systems as elements necessary for achieving actuation of the ELP valves, and to serve as elements that allow the directed synthesis and immobilization of ELPs in microfluidic systems. The electrodes and heaters are designed and fabricated from simple electrical circuits on boards. Custom-made and commercially available kits are used for construction of simple electrical devices that include resistive heaters and electrochemical cells for forming and implementing ELP-based valves. For example, a PDMS (polydimethylsiloxane) based microfluidic system for e.g., with 100 μm capillaries, formed on a simple, custom-made circuit board incorporating resistive micro-heaters are fabricated. Also indirect actuation methods are examined based on radiative heating with infrared radiation based light emitting diodes and laser diodes.

EXAMPLE 2

Small molecules like fluorescein and low molecular weight polymers and peptides were patterned on silica-PNIPAM hybrid membranes using UV laser. These patterned materials were able to reversibly leave the surface while washing if the temperature of the membrane was above the transition temperature.

EXAMPLE 3

Figure 5:
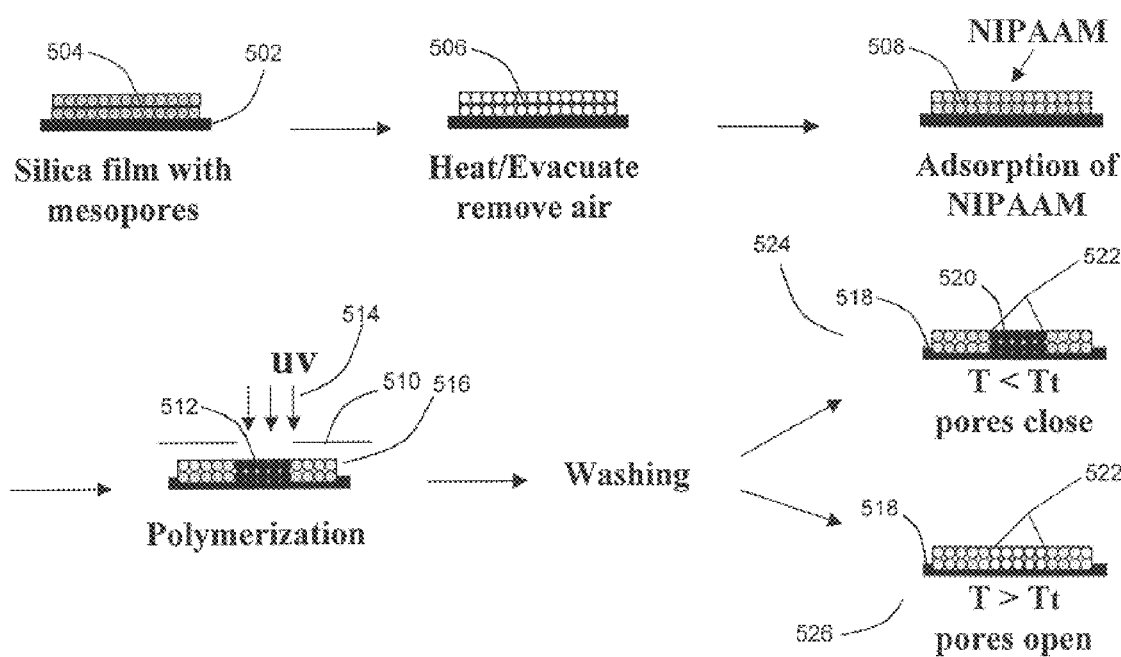
FIG. 5 is a schematic illustration of the synthesis of a poly N-isopropylacrylamide (PNIPAAM)-based hybrid material for active nanofluidic systems of the present invention

FIG. 5 illustrates the synthesis of a poly N-isopropylacrylamide (PNIPAAM)-based hybrid material of the present invention. The starting material was a silica film 502 with air-filled mesopores 504. Silica film 502 was exposed to heat and air was evacuated to form air evacuated mesopores 506. N-isopropylacrylamide (NIPAAM) was applied to silica film 502 by exposing to vapor or liquid NIPAAM and the NIPAAM was adsorbed into NIPAAM filled mesopores 508. A mask 510 made from photographic slide was placed over silica film 502 and NIPAAM was polymerized in an exposed region 512 by ultraviolet radiation 514 to for PNIPAAM. NIPAAM remains unpolymerized in unexposed region 516. Silica film 502 was then washed with water to remove unpolymerized NIPAAM. Resulting hybrid material 518 included pores 520 of valve region 522 which are closed or opened by PNIPAAM actuators (not shown) present in pores 520. When the temperature T of valve region 522 is <$T_t$~32° C., valve region 522 is in a closed position 524 and pores 520 are closed by the PNIPAAM actuators. When the temperature T of valve region 522 is >$T_t$~32° C., valve region 522 is in an open position 526 and pores 520 are closed by the PNIPAAM actuators.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A valve comprising:
   at least one channel; and
   a hybrid material located in said channel comprising:
      at least one actuator, said at least one actuator comprising a stimuli responsive polymer that has first conformation in a first environment and a second conformation in a second environment; and
      a porous framework material for supporting said at least one actuator, wherein said stimuli responsive polymer is dispersed throughout said porous framework material.

2. The valve of claim 1, wherein said at least one channel comprises a plurality of channels.

3. The valve of claim 1, wherein said at least one actuator comprises a plurality of actuators.

4. The valve of claim 1, wherein said stimuli responsive polymer comprises an elastin like polypeptide.

5. The valve of claim 1, wherein said at least one actuator has a diameter in at least one direction of about 1 μm.

6. The valve of claim 1, wherein said porous framework material comprises pores having a diameter in at least one direction of about 1 μm to about 10 μm.

7. A method for forming a valve comprising:
   providing at least one channel; and
   forming a hybrid material in said channel, wherein said forming a hybrid material comprises providing at least one actuator, said at least one actuator comprising a stimuli responsive polymer that has a first conformation in a first environment and a second conformation in a second environment; and immobilizing said actuator on a porous framework material, wherein said stimuli responsive polymer is dispersed throughout said porous framework material.

8. The method of claim 7, wherein said at least one channel comprises a plurality of channels.

9. The method of claim 7, wherein said at least one actuator comprises a plurality of actuators.

10. The method of claim 7, wherein said stimuli responsive polymer comprises an elastin like polypeptide.

11. The method of claim 7, wherein said at least one actuator has a diameter in at least one direction of about 1 $\mu$m.

12. The method of claim 7, wherein said porous framework material comprises pores having a diameter in at least one direction of about 1 $\mu$m to about 10 $\mu$m.

13. A valve comprising:

at least one channel; and a hybrid material located in said channel comprising:

at least one actuator, said at least one actuator comprising a stimuli responsive polymer that has first conformation in a first environment and a second conformation in a second environment, wherein said stimuli responsive polymer comprises an elastin like polypeptide; and a porous framework material for supporting said at least one actuator.

14. A method for forming a valve comprising:

providing at least one channel; and forming a hybrid material in said channel, wherein said forming a hybrid material comprises providing at least one actuator, said at least one actuator comprising a stimuli responsive polymer that has a first conformation in a first environment and a second conformation in a second environment, wherein said stimuli responsive polymer comprises an elastin like polypeptide; and immobilizing said actuator on a porous framework material.

* * * * *